United States Patent
Saillet et al.

(10) Patent No.: US 11,651,055 B2
(45) Date of Patent: May 16, 2023

(54) MEASURING DATA QUALITY OF DATA IN A GRAPH DATABASE

(71) Applicant: International Business Machines Corporation, Armonk, NY (US)

(72) Inventors: Yannick Saillet, Stuttgart (DE); Claudio Andrea Fanconi, Celerina (CH); Martin Oberhofer, Sindelfingen (DE); Hemanth Kumar Babu, Boeblingen (DE); Basem Elasioty, Regensburg (DE); Mike W. Grasselt, Leinfelden-Echterdingen (DE); Robert Kern, Karlsruhe (DE); Thuany Karoline Stuart, Aachen (DE)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 17/083,357

(22) Filed: Oct. 29, 2020

(65) Prior Publication Data
US 2022/0138512 A1    May 5, 2022

(51) Int. Cl.
*G06F 18/2413* (2023.01)
*G06F 18/22* (2023.01)
(Continued)

(52) U.S. Cl.
CPC ........ *G06F 18/24147* (2023.01); *G06F 18/22* (2023.01); *G06F 18/24765* (2023.01); *G06N 5/025* (2013.01)

(58) Field of Classification Search
None
See application file for complete search history.

(56) References Cited

U.S. PATENT DOCUMENTS 7,783,096 B2 * 8/2010 Chen ................ G06T 7/207
382/128
7,836,004 B2 * 11/2010 Roth ................ G06F 16/215
706/47

(Continued)

OTHER PUBLICATIONS

"Data Quality Measurement for NoSQL Databases: Graph databases—Neo4J", Johannes Kepler University Linz, Altenberger Straβe 69, 4040 Linz, Austria JKU/faw/Teaching/Bachelor / Master's Theses/, retrieved from the Internet on Feb. 28, 2020, 1 page, <https://www.jku.at/en/faw/teaching/bachelor-masters-theses/data-quality-measurement-for-nosql-databases-graph-databases-neo4j/>.

(Continued)

*Primary Examiner* — Tahmina N Ansari
(74) *Attorney, Agent, or Firm* — Nicholas A. Welling

(57) ABSTRACT

Methods, computer program products and/or systems are provided that perform the following operations: obtaining a first graph comprising first nodes representing first entities and first edges representing relationships between first entities, the first nodes being associated with first entity attributes descriptive of the first entities represented by the first nodes, the first edges being associated with first edge attributes descriptive of the relationships represented by the first edges; determining a first subgraph for a certain node of the first nodes of the first graph, the first subgraph including the certain node and at least one neighboring node of the certain node; and determining a data quality issue regarding the certain node based, at least in part, on applying one or more applicable rules of a set of data quality rules to first entity attribute values and first edge attribute values of the first subgraph.

18 Claims, 5 Drawing Sheets

(51) Int. Cl.
    *G06F 18/24*    (2023.01)
    *G06N 5/025*    (2023.01)

(56) References Cited

U.S. PATENT DOCUMENTS

| | | | | |
|---|---|---|---|---|
| 9,002,898 | B2* | 4/2015 | Narayanan | H04L 67/02 |
| | | | | 707/798 |
| 10,068,666 | B2* | 9/2018 | Yamamoto | G16H 50/20 |
| 10,685,053 | B2* | 6/2020 | Dhanyamraju | G06F 16/337 |
| 10,872,692 | B2* | 12/2020 | Yamamoto | G06F 16/9024 |
| 2015/0379409 | A1* | 12/2015 | Hu | G06N 5/02 |
| | | | | 706/55 |
| 2017/0330357 | A1* | 11/2017 | Siegel | G06F 16/248 |
| 2018/0197128 | A1* | 7/2018 | Carstens | G06F 16/9024 |

OTHER PUBLICATIONS

Eifrem, Emil, "When the Relationships in Data Are More Important Than the Data Itself", Transforming Data with Intelligence (TDWI) Feb. 13, 2017, 7 pages, <https://tdwi.org/articles/2017/02/13/relationships-in-data-more-important-than-the-data.aspx>.

Guney, Atakan, "Inference in Graph Database", Towards Data Science, Dec. 12, 2019, 10 pages, <https://towardsdatascience.com/inference-in-graph-database-7203938932a0>.

* cited by examiner

200

```
Determining a subgraph for a certain node of
an obtained first graph                          —201
                    │
                    ▼
Determining a data quality issue regarding the
certain node using the subgraph and based, at
least in part, on applying one or more applicable —203
rules from a set of data quality rules
```

```
Providing a second graph                          —301
                    │
                    ▼
Determining a second subgraph for each
second edge of the second graph                   —303
                    │
                    ▼
Determining data quality rules using the
second subgraphs                                  —305
```

Fig. 3

MEASURING DATA QUALITY OF DATA IN A GRAPH DATABASE

BACKGROUND

The present invention relates generally to the field of computer systems, and more particularly to data quality of data in a graph database.

A database system may, for example, use graph structures for semantic queries with nodes, edges, and properties/attributes to represent and store data. The graph relates the data items in the database to a collection of nodes and edges, with the edges representing the relationships between the nodes. The relationships can allow data in the data store to be linked together directly and, in many cases, retrieved with a single operation.

SUMMARY

According to an aspect of the present disclosure, there is a method, computer program product, and/or system that performs the following operations (not necessarily in the following order): obtaining a first graph comprising first nodes representing first entities and first edges representing relationships between first entities, the first nodes being associated with first entity attributes descriptive of the first entities represented by the first nodes, the first edges being associated with first edge attributes descriptive of the relationships represented by the first edges; determining a first subgraph for a certain node of the first nodes of the first graph, the first subgraph including the certain node and at least one neighboring node of the certain node; and determining a data quality issue regarding the certain node based, at least in part, on applying one or more applicable rules of a set of data quality rules to first entity attribute values and first edge attribute values of the first subgraph, wherein the set of data quality rules is representative of expected relations between types of edges between graph nodes and attributes of the graph nodes.

BRIEF DESCRIPTION OF THE DRAWINGS

In the following, embodiments of the invention are explained in greater detail, by way of example only, making reference to the drawings in which:

FIG. 2 is a flowchart of operations for processing a graph, in accordance with embodiments of the present disclosure.

FIG. 3 is a flowchart of operations for determining data quality rules, in accordance with embodiments of the present disclosure.

DETAILED DESCRIPTION

Figure 1A:
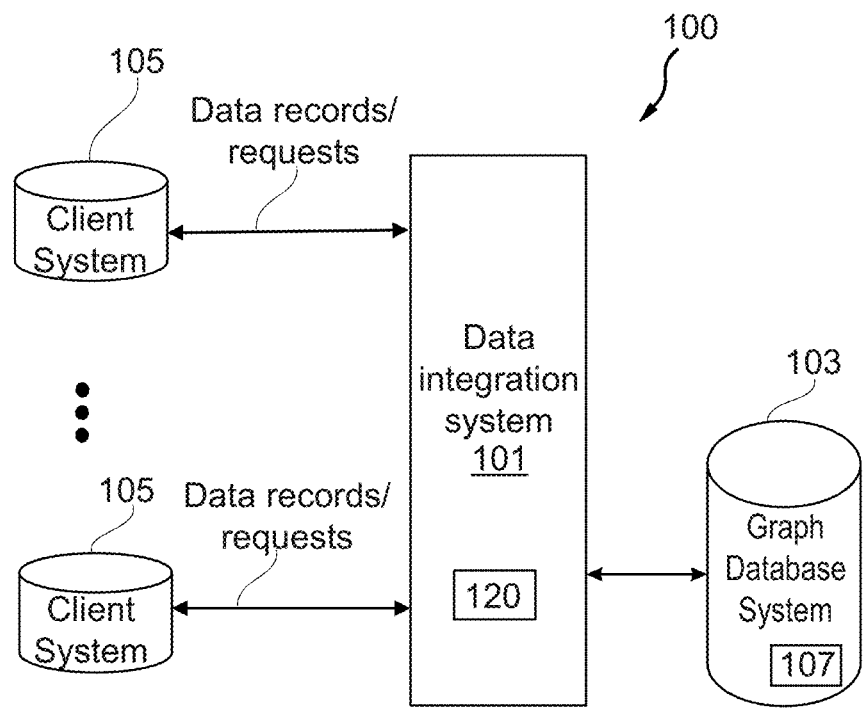
FIG. 1A is a diagram of a computing system, in accordance with embodiments of the present disclosure.

The descriptions of the various embodiments of the present invention will be presented for purposes of illustration but are not intended to be exhaustive or limited to the embodiments disclosed. Many modifications and/or variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

According to aspects of the present disclosure, systems, methods, and computer program products can be provided to measure data quality of data in a graph database. In particular, systems, methods, and computer program products of the present disclosure can provide for detecting inconsistencies (e.g., data quality issues) in the relations between the nodes in a graph and the properties/attributes of these nodes, as well as detecting inconsistencies in the fields (e.g., attributes, properties, etc.) of a node. For example, embodiments of the present disclosure can provide for building a set of transactions out of the data from a graph and represent it in a tabular form. The embodiments can further apply a known association algorithm to the tabular data (e.g., set of transactions) to identify strong patterns characterizing the relationships between the properties/attributes of the nodes of the graph and their relationships to other nodes and use this data to generate rules about association relationships. The embodiments can apply the identified association rules to all the nodes and relationships of the graph to identify violations of these rules. The nodes and/or edges of the graph associated with the identified violations of the association rules can be marked as potential data quality issues, which can then be addressed as appropriate.

A graph refers to a property graph where data values are stored as properties on nodes and edges. Property graphs may be included in a graph database (GDB) and may be managed and processed by a graph database management system or other database systems that may provide a wrapper layer converting the property graph to, for example, relational tables for storage and convert relational tables back to property graphs when read or queried. Such a graph may, for example, be a directed graph. The graph may be a collection of nodes (also called vertices) and edges. An edge of the graph connects any two nodes of the graph. The edge may, for example, be represented by an ordered pair (v1, v2) of nodes and can be traversed from node v1 toward node v2.

A node of the graph may represent an entity, as one example. The entity may refer to a user (e.g., employee, etc.), an object, a company, another individual, and/or the like. The entity (and the corresponding node) may have certain one or more entity attributes and/or properties which may be assigned values. For example, a person may be an entity. The entity attributes of the person may, for example, comprise a marital status, age, gender, identifying data, and/or the like. The attribute values that represent the node are values of the entity attributes of the entity represented by the node. The edge between two nodes may be assigned one or more edge attribute values indicative of at least a relationship between the two nodes connected to the edge. The attribute values that represent the edge are values of the edge attributes. The relationship may, for example, comprise an inheritance relationship (e.g., parent and child) and/or an associative relationship in accordance with a certain hierarchy. For example, the inheritance relationship between nodes v1 and v2 may be referred to as a "is-a relationship" between v1 and v2 (e.g., "v2 is-a parent of v1"). The associative relationship between nodes v1 and v2 may be referred to as a "has-a relationship" between v1 and v2 (e.g., "v2 has a has-a relationship with v1") meaning that v1 is part of, is a composition of, or is associated with v2.

The graph may represent entities and relationships of a set of one or more domains. A domain (also referred to as domain ontology) can represent concepts and/or categories that belong to a part of the world, such as, for example, industry, biology, politics, and/or the like. The domain can typically model domain-specific definitions of terms. For example, a domain can refer to a healthcare-specific field, advertising-specific field, commerce-specific field, medical-specific field, biomedical-specific field, and/or the like. A set of one or more domains may represent an ontology. For example, a set of domains may comprise a family domain and a company domain, wherein the family domain and company domain belong to a same ontology which may be, for example, an employee ontology.

Processing graphs associated with a graph database may however be technically challenging because graphs may often have thousands or millions of nodes and edges, such as, for example, a graph that stores data of millions of customer records, contracts, and/or the like, as well as person records related to companies with hundreds of thousands of employees. This may be particularly challenging in the case of data deduplication, data communication over a network, and/or any other processing of the graphs. For example, a master data management (MDM) system can use graphs as persistent storage which may identify duplicate records and may need to resolve such duplicate record issues, if applicable. This process can generally be a matching process and may use deterministic and/or probabilistic matching techniques with fuzzy operators such as phonetics (e.g., Soundex, NYSIIS, etc.), edit distance, nick name resolution, and/or the like. In addition, the data associated with the graph may have a set of data quality problems/issues. A data quality problem/issue may depend on the domain of the set of domains represented by the graph. For example, the set of data quality problems may comprise a subset of data quality problems of a family domain and another subset of data quality problems of another domain, or the like.

Aspects of the present disclosure can provide for measuring data quality in a graph database by identifying data quality issues in some data associated with a graph or graphs in a graph database using the context of nodes and limiting that identification of data quality issues to each subgraph structure. In some embodiments, this may allow for processing the graph(s) in a more efficient way because it uses subgraphs and can provide more reliable data by indicating the quality of the data. For example, a data quality issue regarding a node of a graph (e.g., subgraph, etc.) can be determined by considering its neighboring nodes. Instead of only looking for inconsistencies inside individual records, the fact that data are organized in a graph (e.g., where nodes contain attributes and have edges or links of a certain type (relationship) to other nodes) adds an additional dimension, that the relationships between the nodes of a graph may be as important as the properties of the nodes themselves, when determining data quality issues for data in a graph database. Accordingly, embodiments of the present disclosure can provide for detecting inconsistencies in the relations between the nodes of a graph as well as detecting inconsistencies in the fields of a node within the graph.

Generally, there may be four distinct quality issues that may be identified when observing a graph database (GDB) which may not appear in relational databases. First, some attributes might infer relations (e.g., between nodes) and vice versa. Inconsistencies may therefore be found with regard to attributes versus relations. For example, a node E1 may indicate a marital status attribute of single (for the individual/entity represented by node E1). However, the edge (e.g., link) between node E1 and node E2 may indicate an edge relation of "E1 isSpouseOf E2", representing a spousal relationship between the entity represented by node E1 and the entity represented by node E2. As such, this would identify an inconsistency, or potential data quality issue, with data associated with the node E1 or the edge between node E1 and node E2.

In a triangle case, a quality issue may arise when relations with an entity could infer a relation between the two other entities which were not originally neighbours (e.g., not actually related as is being inferred). For example, if an edge (e.g., link) between a node E1 and a node E2 indicates an edge relation of "E1 isParentOf E2" and an edge (e.g., link) between a node E1 and a node E3 indicates an edge relation of "E1 isParentOf E3", this may infer relations of "E2 isSiblingOf E3" and "E3 isSiblingOf E2" between node E2 and node E3, which may not be correct.

Another data quality issue may arise when a relation may infer another relation with the same entity. For example, an edge (e.g., link) between a node E1 and a node C1 may indicate an edge relation of "E1 isEmployed C1" which may infer a relation "E1 hasContract C1" that may not be accurate. Another data quality issue may arise in finding false bijections between two relations, for example, "E1 isManager E2" cannot be consistent with or infer "E2 isManager E1".

In some embodiments, a detected data quality issue may, for example, be based at least on one of: at least one edge of said certain node and at least one entity attribute of said certain node of the first subgraph, and at least one edge of said certain node and another edge of said certain node of the first subgraph.

In some embodiments, a distance in the first subgraph between the certain node and any other first node of the first subgraph can be smaller than or equal to one distance of a predefined set of distances. The term "distance" above refers to a distance between two nodes in a graph which is the number of edges in a shortest path (also called a graph geodesic) connecting the two nodes.

A first subgraph may, for example, comprise nodes $n_i^1$, where i=0, . . . n1−1, where n1 is the number of nodes in the first subgraph. i has a distinct value for each first node of the first subgraph. The first edges may be referenced by $E_{ij}^1$ where i and j are indices of first nodes $n_i^1$ and $n_j^1$ which are connected to the first edge $E_{ij}^1$. For example, the certain node may be referenced by $n_0^1$. The distance between the certain node $n_0^1$ and any other first node $n_i^1$ (i>0) of the first subgraph may be smaller than or equal to a selected distance. The selected distance may be selected from a predefined set of distances. In some embodiments, the selection may, for example, be a random selection. In another example, the selection may be performed as part of an iteration process. The iteration process may comprise the repetition of the method for each distance of the set of distances. The selection of the distance is performed until all distances of the set of distances are selected. In another example, the selection may be performed by prompting a user and receiving a user input indicative of the selected distance.

In some embodiments, the predefined set of distances may, for example, be user defined where the user may define distances that he or she thinks are relevant for detecting data quality issues in the first graph. The set of distances may, for example, be distances used to (pre)determine data quality rules that are used to detect the data quality issues.

In some embodiments, the first subgraph is formed by the certain node $n_0^1$, another first node $n_i^1$ connected to the certain node $n_0^1$ via a first edge $E_{i0}^1$ and at least one first node $n_j^1$ neighboring to the certain node $n_0^1$ or to the other node $n_i^1$. For example, the first node $n_j^1$ may be linked, via a first edge $E_{j0}^1$ to the certain node $n_0^1$ or via a first edge $E_{ij}^1$ to the first node $n_i^1$. That is, the first subgraph comprises at least three first nodes $n_0^1$, $n_i^1$ and $n_j^1$ and two first edges $E_{i0}^1$ and $E_{ij}^1/E_{j0}^1$. Such embodiments may enable a compact structure of the first subgraph that allows for efficiently identifying data quality issues without having to check larger subgraphs. This may be particularly advantageous as individual relationships may be defined with few nodes in many ontology domains. For example, in a family domain, the family context of a node may be defined by few neighboring nodes that represent the family members.

For example, in some embodiments, the first graph may represent entities and relationships of an ontology such as an employee ontology. The ontology may comprise different domains. For example, the employee ontology may comprise a set of domains such as a family domain and company domain. The first subgraph may, for example, be determined so that it represents a single domain (e.g., family domain, company domain, etc.).

In some embodiments, detecting of data quality issue(s) includes determining that one or more first entity attribute values of the certain node and/or one or more first edge attribute values of a first edge to which the certain node is connected have the data quality issue. This may, for example, be performed by comparing the values of the first entity attributes of the certain node $n_0^1$ with values of the first entity attributes of the other nodes $n_j^1$ of the first subgraph as well as with values of the first edge attributes of the edges $E_{ij}^1$ of the first subgraph. In another example, in some embodiments, the detection of a data quality issue may be performed using rules representing expected relations between types of edges between the nodes of the first subgraph and attributes of these nodes and/or using rules representing expected relations between types of edges between the nodes of the first subgraph and other edges between nodes of the first subgraph. These rules may be determined or generated using a graph that is different from the first graph.

In some embodiments, the detection of data quality issue(s) can further include marking at least one of the certain node and a first edge to which the certain node is connected as having the data quality issue. This may enable an optimal processing of the first graph. For example, the user may skip or take into account nodes or edges which are labeled or marked as having data quality problems.

In some embodiments, the detection of data quality issue(s) can further include processing a second graph comprising second nodes representing second entities and second edges representing relationships between second entities. The second nodes are associated with second entity attributes being descriptive of the second entities represented by said second nodes. The second edges are associated with second edge attributes being descriptive of the relationships represented by said second edges. The processing of the second graph can include, for each second edge of the second graph, forming one or more second subgraphs. Each second subgraph of the second subgraphs has a distance between a second node of the second edge and any other second node of the second subgraph smaller than or equal to a respective predefined maximum neighborhood level. The maximum neighborhood level may be an integer value higher than or equal to one. The maximum neighboring levels may be the same or different for each second subgraph of the second graph. The maximum neighborhood levels of the second subgraphs define the set of distances, that is each distance of the set of distances is equal to a maximum neighboring level that has been used to generate a second subgraph. The detecting of data quality issue(s) can further include determining data quality rules (e.g., association rules, etc.) based on relations between attribute values of second entity attributes and attribute values of second edge attributes of the formed second subgraphs and applying the data quality rules (e.g., association rules, etc.) on the first graph to provide for detecting data quality issues.

In some embodiments, the data quality rules (e.g., association rules, etc.) can be generated from subgraphs of the second graph. This may allow for an automatic execution of the measuring of data quality in a graph database, for example, such that a user intervention may be reduced or eliminated. In some embodiments, the generated data quality rules (e.g., association rules, etc.) may further be used automatically to detect data quality issues in another graph, for example, in the first graph. As an example, a data quality rule (e.g., association rule, etc.) may be determined for each second subgraph of the second subgraphs. The data quality rule (e.g., association rule, etc.) of a second subgraph may be represented by a combination of values of the edge and entity attributes of the second subgraph. The data quality rule (e.g., association rule, etc.) may be provided in a predefined data structure, for example, a tuple indicating entities and their relations as well as their properties/attributes. In some embodiments, a same data structure type may be used when processing the first subgraphs to encode the combination of values of the first subgraph in that data structure. This may allow for comparing the data structures provided as rules with the data structures generated from the first graph.

For example, in some embodiments, the determining of data quality rules (e.g., association rules, etc.) can include traversing the second graph and computing a transaction for each edge of the second graph. The transaction is made up of all entity attributes of both the source node and target node of the edge, the type of the edge, and all types of edges connecting the target node to any other neighbor node of the target node. In some embodiments, a data mining technique may be applied to detect strong patterns in the rules. In some embodiments, such detected rules with too low confidence or too low support may be eliminated. The applying of the data mining technique can include applying an association algorithm.

In some embodiments, the detection of data quality issue(s) can further include defining a maximum neighborhood level such that a number of nodes in the second subgraph is smaller than a maximum number of nodes. This may provide for a configurable parameter that can be used to efficiently control the processing of the graphs in accordance with embodiments of the present disclosure.

In some embodiments, the determining of data quality rules can include generating a database entry for each second subgraph of the second subgraphs. The database entry can include the entity attribute values and edge attributes values of the second nodes and the second edges of said each second subgraph. In some embodiments, an association algorithm may be applied on the database entries to detect association rules. Association rules can be selected from the detected association rules based on their confidence (e.g., having a confidence above a defined level), such that the data quality rules can include the selected association rules. Such embodiments may provide for a systematic and controllable way to produce quality rules. In some embodiments, the selecting of association rules can include eliminating detected association rules having a confidence smaller than a threshold value.

In some embodiments, the first graph and the second graph may represent a same domain ontology. In some embodiments, the first graph and the second graph may be different sub-graphs of a same graph. In some embodiments, the first graph and the second graph, as described above, may be the same graph, which may provide for an efficient test environment and validation of the quality issue detection.

In some embodiments, the detection of data quality issue(s) can further include processing a second graph comprising second nodes representing second entities and second edges representing relationships between second entities. The second nodes are associated with second entity attributes being descriptive of the second entities represented by said second nodes. The second edges are associated with second edge attributes being descriptive of the relationships represented by said second edges. The processing of the second graph can include, for each second edge of the second graph, forming a second subgraph having a same structure as the first subgraph, determining data quality rules based on relations between attribute values of second entity attributes and attribute values of second edge attributes of the formed second subgraphs, and applying the data quality rules on the first graph for detecting the data quality issue.

The terms "first," "second," and the like are used herein as labels for nouns that they precede, and do not imply any type of ordering (e.g., spatial, temporal, logical, etc.) unless explicitly defined as such.

FIG. 1A depicts an exemplary computing system 100 in accordance with embodiments of the present disclosure. The computing system 100 may, for example, be configured to perform master data management and/or data warehousing, such that the computing system 100 may enable a de-duplication system. The computing system 100 includes a data integration system 101 and one or more client systems or data sources 105. The client system 105 may include a computing system (e.g., as described with reference to FIG. 6). The data integration system 101 may control access (e.g., read and write accesses, etc.) to a graph database system 103.

The client system(s) 105 may communicate with the data integration system 101 via a network connection which may comprise, for example, a wireless local area network (WLAN) connection, Wide Area Network (WAN) connection, Local Area Network (LAN) connection, the internet, and/or a combination thereof.

The client system(s) 105 may be configured to receive and/or generate a query request. For example, the client system 105 can generate and/or receive a query request associated with the graph database system 103. The query request may, for example, request the identification of duplicate nodes. The client system 105 can send and/or forward the query request to the data integration system 101. The data integration system 101 may be configured to fetch data using the graph database system 103, for example, to compute the appropriate subsets of a graph 107 of the graph database system 103 to be sent back to the client system 105 in response to the query request.

In another example, each client system 105 may be configured to send data records to the data integration system 101 to be stored by the graph database system 103. A data record (e.g., record) may be a collection of related data items such as a name, date of birth, class of a particular entity, and/or the like. A record can represent an entity, wherein an entity refers to a user, object, or concept about which information is stored in the record. The terms "data record" and "record" are interchangeably used. The graph database system 103 may use the graph 107 in order to store the records as entities with relationships, where each record may be assigned to a node or vertex of the graph 107 with properties being attribute values such as name, date of birth, and/or the like. The data integration system 101 may store the records received from client systems 105 using the graph database system 103, may check for duplicate nodes in the graph 107, and/or may detect data quality issues in the graph 107. For example, the client systems 105 may be configured to provide and/or create data records which may or may not have the same structure as the graph 107. As an example, a client system 105 may be configured to provide records in extensible markup language (XML) format, Java Script Object Notation (JSON) format, and/or other formats that can provide for associating attributes and corresponding attribute values.

In one example, the data integration system 101 may import data records from a client system 105 using one or more Extract-Transform-Load (ETL) batch processes, via HyperText Transport Protocol (HTTP) communication, and/or via other types of data exchange. The data integration system 101 and/or client systems 105 may be associated with, for example, personal computers (PC), servers, mobile computing devices, and/or the like.

The data integration system 101 may be configured to process the graph 107 using one or more algorithms, such as an algorithm 120 that can implement at least part of the operations of the present disclosure. For example, the data integration system 101 may process data records of the graph 107 using the algorithm 120 to find data quality issues within the graph database. Although shown as separate components, the graph database system 103 may be included as part of the data integration system 101 in some embodiments.

Figure 1B:
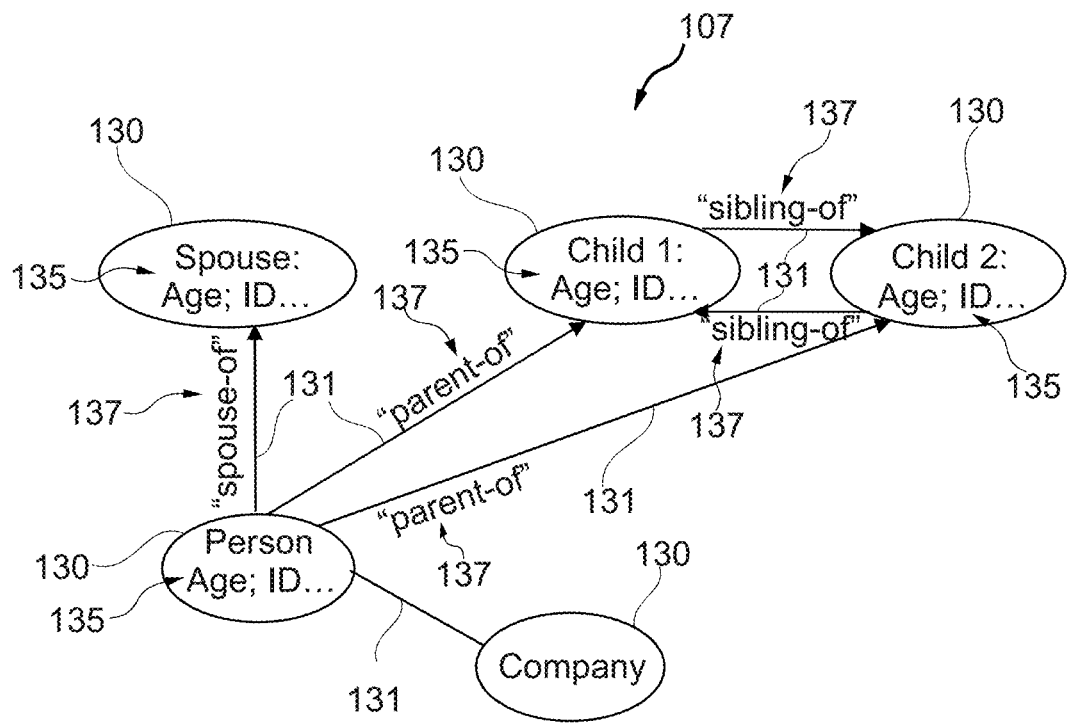
FIG. 1B is a diagram of a simplified structure of a graph, in accordance with embodiments of the present disclosure.

FIG. 1B is a diagram of a simplified structure of the graph 107 in accordance with an example domain ontology. The example ontology concerns employees of a company. The graph 107 can include a plurality of nodes 130 which represent employees of the company (e.g., person node). The graph 107 can also include one or more nodes 130 which represent people related to respective employees (e.g., spouse node, child 1 node, child 2 node, etc.) and/or nodes 130 which represent the company (e.g., company node). Each of the nodes 130 may comprise attribute values of entity attributes of a respective record. For example, a node 130 representing an employee (e.g., person node) can include attribute values of entity attributes 135 such as status, age, identifier data, and/or the like. A node 130 representing a spouse (e.g., spouse node) can include attribute values of entity attributes 135 such as status, age, identifier data, and/or the like. Further, nodes 130 representing children (e.g., child 1, child 2, etc.) may also each include attribute values of entity attributes 135, such as status, age, identifier data, and/or the like, which may be associated with each child.

The nodes 130 are linked together by a plurality of edges 131. An edge 131 can be associated with edge attribute values 137 that can be indicative of the relations between respective nodes. For example, the edge 131 linking the node person and the node spouse is associated with an edge attribute value "spouse-of" indicating that the individual represented by the node person is a spouse of the individual represented by the node spouse. Additionally, the edge 131 linking the node person and the node child 1 is associated with an edge attribute value "parent-of" indicating that the individual represented by the node person is a parent of the individual represented by the node child 1. The edge 131 linking the node person and the node child 2 is associated with an edge attribute value "parent-of" indicating that the individual represented by the node person is a parent of the individual represented by the node child 2. The edge 131 linking the node child 1 and the node child 2 is associated with an edge attribute value "sibling-of" indicating that the individual represented by the node child 1 is a sibling of the individual represented by the node child 2. The edge 131 linking the node child 2 and the node child 1 is associated with an edge attribute value "sibling-of" indicating that the individual represented by the node child 2 is a sibling of the individual represented by the node child 1. By traversing the graph 107, the data integration system 101 can determine which respective nodes are related to which other nodes within the graph.

The graphs are represented in the present drawings (e.g., FIG. 1B, FIG. 4B, FIG. 5B) as follows. The nodes (or vertices) of a graph are represented by circles/ellipses in the drawings and the edges are represented by lines connecting two respective nodes of the graph. Entities such as spouse, person, child 1, child 2, company, and/or the like, which are represented by the nodes, may be identified within the circles/ellipses illustrating the nodes. For simplification of the drawings and the description, only a few nodes and edges are shown with part of their associated entity and edge attributes. However, each node and each edge of a graph may be associated with one or more entity attributes and one or more edge attributes respectively.

FIG. 2 is a flowchart of operations 200 for processing a first graph GR1 (e.g., graph 107, etc.) to measure data quality of the data in a graph database (e.g., to detect any potential data quality issues), in accordance with example embodiments of the present disclosure. For the purpose of explanation, the operations described in FIG. 2 may be implemented in a computing system such as illustrated in FIG. 1, however embodiments are not limited to such implementations. In some embodiments, the operations of FIG. 2 may, for example, be performed by the data integration system 101.

Operations begin at step 201, where a computing system (e.g., computing system 100, computing system 600, and/or the like) can determine a first subgraph $GR1_{sub}$ of the first graph GR1 based on a selected certain node $n_0^1$. For example, the certain node $n_0^1$ may be selected from the first nodes of the first graph GR1 (e.g., graph 107, etc.). In some embodiments, as an example, input may be received indicative of a request to check for data quality issue(s) related to the certain node (e.g., to determine the data quality of the data in the graph). In some embodiments, the certain node may be randomly selected from the graph. In some embodiments, the detection of data quality issue(s) for the certain node $n_0^1$ may be part of a check process (e.g., measurement of data quality, etc.) that is performed for each first node of the first graph GR1 (e.g., graph 107, etc.).

In some embodiments, the structure of the first subgraph may reflect a predefined or predetermined reference structure. The reference structure may, for example, be determined as described with reference to FIG. 3. As an example, the first subgraph includes the certain node $n_0^1$ and at least one neighbouring node $n_i^1$ (i=1 . . . n1) of the certain node $n_0^1$. That is, the first subgraph includes the certain node $n_0^1$, at least one neighbouring node $n_i^1$, and at least one edge $E_{i0}^1$. The certain node $n_0^1$ may have a set of first entity attributes $a_0^1 \ldots a_0^{N0}$. Each of the at least one neighbouring node $n_i^1$ may have a set of first entity attributes $a_i^1 \ldots a_i^{Ni}$, where N0 and Ni is the total number of entity attributes. Each of the at least one edge may have a set of edge attributes $b_{i0}^1 \ldots b_{i0}^{Ni0}$.

Operations proceed to step 203, where the computing system can detect or otherwise determine any data quality issue(s) associated with the certain node $n_0^1$ of the first graph GR1. The data quality issue(s) may be detected based on first entity attribute values and first edge attribute values of the first subgraph $GR1_{sub}$ of the first graph GR1. In some embodiments, data quality issue(s) may, for example, be determined as described with regard to FIG. 5A. For example, in some embodiments, the detection of data quality issue(s) may be performed in part by determining one or more combinations of attributes, such as comb1, comb2 . . . combM. Each combination of the combinations of attributes may comprise values of at least part of the attributes $a_0^1 \ldots a_0^{N0}$, at least part of the attributes $a_i^1 \ldots a_i^{Ni}$, and at least part of the attributes $b_{i0}^1 \ldots b_{i0}^{Ni0}$. As an example, the combination comb1 may be the triplet $(a_0^1, a_j^3, b_{i0}^2)$, the combination comb2 may be $(a_0^1, a_0^4, a_i^2, a_j^3, b_{i0}^2)$, and so on.

Figure 5A:
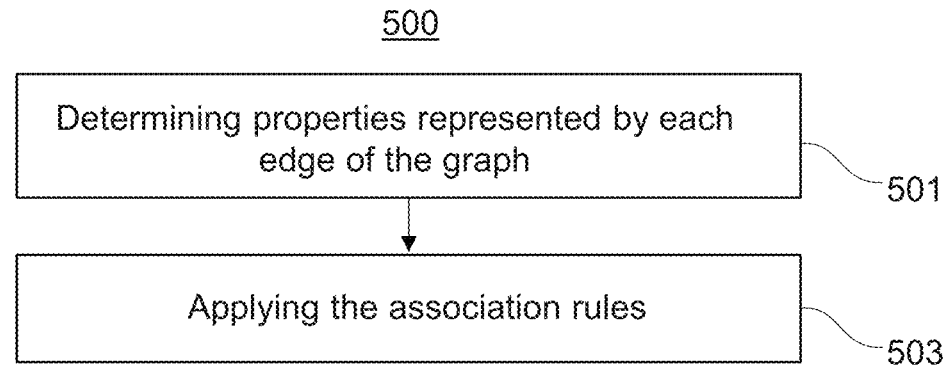
FIG. 5A is a flowchart of operations for detecting data quality issues, in accordance with embodiments of the present disclosure.
Figure 5B:
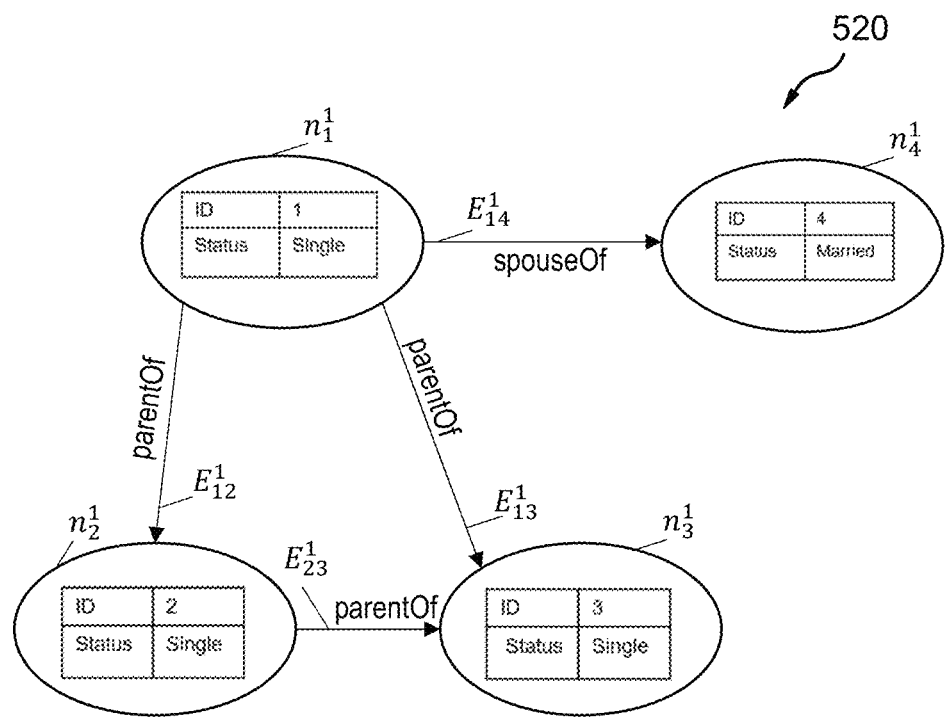
FIG. 5B depicts an example graph, in accordance with embodiments of the present disclosure.

In some embodiments, for example, the data included in the graph database (e.g., the nodes of a subgraph with attributes and relations to other nodes) for which data quality is to be measured (e.g., to determine data quality issues, etc.) may be processed by traversing the subgraph and building a set of table entries and/or transactions out of the data included in the subgraph such that it may be represented in tabular form, such as described with regard to step 501 of FIG. 5A for example. As an example, entries/transactions can be built/computed for each edge, and may be made up of all the attribute values of both the source node and the target node connected by the edge, the edge attribute value (e.g., type of relationship) for the edge, and all the edge attribute values (e.g., types of relations) of edges connecting the target node to any other neighbour node of the target node.

Further, each of the combinations of attributes may be checked to determine if the combination fulfils an expectation of what should be the represented in the combination of attributes, such as described, for example, with regard to step 503 of FIG. 5A. To facilitate such determinations, in some embodiments, one or more references (e.g., data quality rules, association rules, etc.) may be generated and/or otherwise provided for each combination of the combinations. As an example, in some embodiments, an association algorithm can be applied to find strong patterns characterizing the relationships between the properties/attributes of the nodes of the graph and their relationships to generate/provide the one or more references (e.g., data quality rules, association rules, etc.). The references (e.g., data quality rules, association rules, etc.) can represent the expected relations between types of edges (e.g., links) between the nodes and attributes of these nodes. For example, two references (e.g., data quality rules, association rules, etc.), $comb1_{ref1}$ and $comb1_{ref2}$, may be provided for the combination comb1 and so on. Each of the combinations, comb1, comb2 ... combM, may be compared with one or more associated references (e.g., data quality rules, association rules, etc.) for use in determining/detecting data quality issue(s), for example, by identifying nodes and/or edges that violate the associated references (e.g., data quality rules, association rules, etc.).

In a case where any one of the combinations comb1, comb2 ... combM does not match any one of the corresponding references (e.g., data quality rules, association rules, etc.), such a result may indicate that there is a data quality issue for the data. When a combination violates (e.g., does not match, etc.) a corresponding reference (e.g., data quality rule, association rule, etc.), the nodes and/or edges violating the references (e.g., data quality rules, association rules, etc.) can be provided (e.g., marked, etc.) with an indicator of a potential data quality issue. For example, comb1 may be compared with each of the references (e.g., association rules, etc.) comb1$_{ref1}$ and comb1$_{ref2}$. If comb1 is equal to (e.g., matches, etc.) one of the two references comb1$_{ref1}$ or comb1$_{ref2}$, there is no data quality issue. If comb1 is not equal to (e.g., does not match, etc.) either one of the two references (e.g., association rules, etc.) comb1$_{ref1}$ and comb1$_{ref2}$, such a result indicates that there is a potential data quality issue for the data. The associated nodes and/or edges can be marked as having potential data quality issue(s).

As an example, the combination of attributes comb1 may have the following values ("single", "single", "spouse of") which has a data quality issue because two single individuals cannot also be considered married at the same time. The reference combinations comb1$_{ref1}$ and comb1$_{ref2}$ may have the following values respectively: ("single", "single", "sibling of"), and ("married", "married", "spouse of"). The comparison of the combination comb1 with comb1$_{ref1}$ and comb1$_{ref2}$ would reveal that there is a data quality issue and the nodes and/or edges associated with the combination of attributes comb1 can be provided (e.g., marked) with an indicator of a potential data quality issue.

In some embodiments, data quality rules may be applied on the first subgraph to detect a data quality issue. The data quality rules may be obtained as described with reference to FIG. 3.

FIG. 3 is a flowchart of operations 300 for determining data quality rules in accordance with embodiments of the present disclosure.

Operations begin at step 301, where a computing system (e.g., computing system 100, computing system 600, and/or the like) can obtain or be otherwise provided with a graph. The graph obtained or provided in step 301 may be referred to as second graph GR2 for clarification of the description. The second graph GR2 can include second nodes $n_i^2$ representing second entities and second edges $E_{ij}^2$ representing relationships between second entities of two nodes $n_i^2$ and $n_j^2$. The second nodes $n_i^2$ can be associated with second entity attributes that are descriptive of the second entities represented by said second nodes. The second edges $E_{ij}^2$ can be associated with second edge attributes that are descriptive of the relationships represented by said second edges.

Operations proceed to step 303, where the computing system can form a second subgraph GR2$_{sub}^{ij}$ for each second edge $E_{ij}^2$ of the second graph GR2. In some embodiments, each second subgraph of at least part of the second subgraphs GR2$_{sub}^{ij}$ may have the same structure as the first subgraph GR1$_{sub}$ of FIG. 2. For example, in some embodiments, each second subgraph of the second subgraphs GR2$_{sub}^{ij}$ may have the same structure as the first subgraph GR1$_{sub}$ of FIG. 2. That is, the structure of subgraphs GR2$_{sub}^{ij}$ may be provided as a reference structure for the operations described in FIG. 2, in some embodiments. Each second subgraph GR2$_{sub}$ of the second subgraphs has a distance between a second node of the second edge and any other second node of the second subgraph smaller than or equal to a predefined maximum neighbourhood level. In some embodiments, for example, the second subgraphs GR2$_{sub}^{ij}$ may be provided using the same maximum neighbourhood level. In some embodiments, as another example, a subset of the second subgraphs GR2$_{sub}^{ij}$ may be provided with a maximum neighbourhood level d1 while another subset of the second subgraphs GR2$_{sub}^{ij}$ may be provided with a maximum neighbourhood level d2 which is different from d1. In some embodiments, as another example, each second subgraph of the second subgraphs GR2$_{sub}^{ij}$ may be provided using a different maximum neighbourhood level. The maximum neighbourhood level(s) used to determine the second subgraphs define respective structures of the second subgraphs. Those structures may be provided as reference structures that can be used to define the first subgraphs as provided in the operations described in FIG. 2.

Operations proceed to step 305, where the computing system can determine data quality rules (e.g., association rules, etc.) based on relations between attribute values of second entity attributes and attribute values of second edge attributes of the formed second subgraphs GR2$_{sub}^{ij}$. For example, in some embodiments, data quality rules may, for example, be automatically generated by applying an association rule mining/learning process/algorithm on the attribute values of the second subgraphs. In some embodiments, as another example, a user may be prompted to provide data quality rules based on the second subgraphs. In such embodiments, user input indicative of the data quality rules may be obtained by the computing system.

Figure 4A:
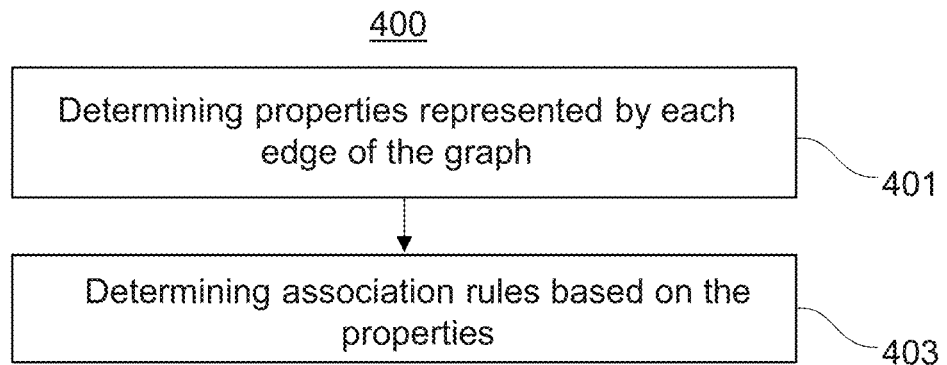
FIG. 4A is a flowchart of operations for determining data quality rules, in accordance with embodiments of the present disclosure.
Figure 4B:
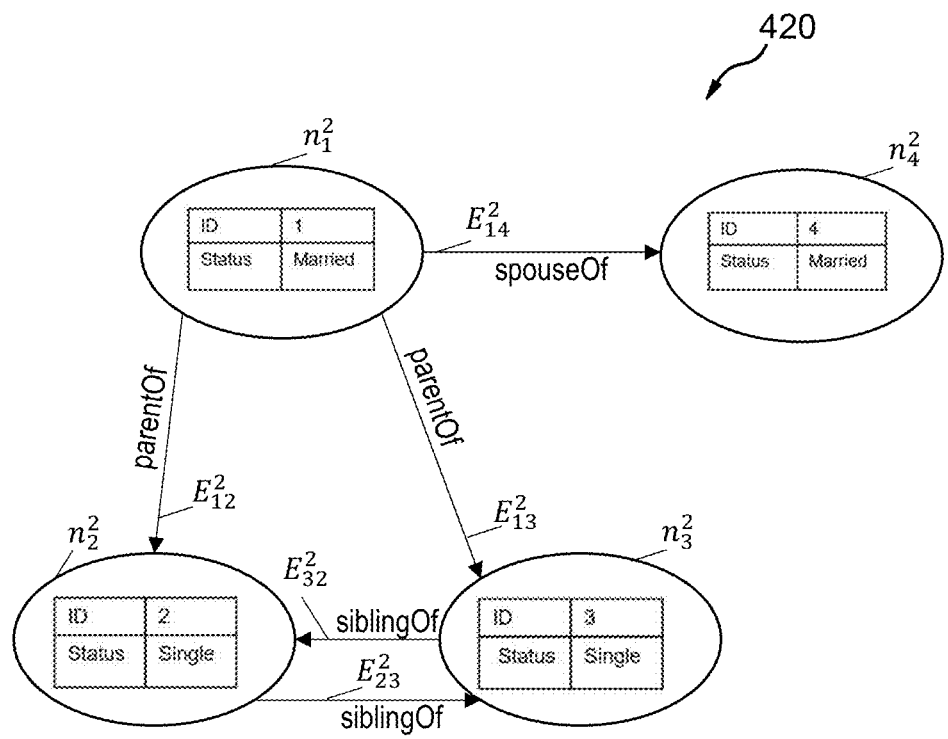
FIG. 4B depicts an example graph, in accordance with embodiments of the present disclosure.

FIG. 4A is a flowchart of operations 400 for generating data quality rules in accordance with embodiments of the present disclosure. The operations of FIG. 4A may be described with reference to the graph 420 shown in FIG. 4B.

The graph 420 comprises four nodes $n_1^2, n_2^2, n_3^2$, and $n_4^2$. Each of the nodes $n_1^2, n_2^2, n_3^2$, and $n_4^2$ has values of the entity attributes ID and Status of the entity associated with the node. For example, the node $n_1^2$ represents an entity being a person having ID=1 and a married status. The graph 420 further includes an edge $E_{12}^2$ linking the node $n_1^2$ (e.g., the source node) to the node (e.g., the target node). The edge $E_{12}^2$ has an edge attribute value "parent of" indicating that the entity represented by node $n_1^2$ is a parent of the entity represented by node $n_2^2$. The graph 420 further includes an edge $E_{13}$ linking the node $n_1^2$ to the node $n_3^2$. The edge $E_{13}^2$ has an edge attribute value "parent of" indicating that the entity represented by node $n_1^2$ is a parent of the entity represented by node $n_3^2$. The graph 420 further includes an edge $E_{14}^2$ linking the node $n_1^2$ to the node $n_4^2$. The edge $E_{14}^2$ has an edge attribute value "spouse of" indicating that the entity represented by node $n_1^2$ is a spouse of the entity represented by node $n_4^2$. The graph 420 further includes an edge $E_{23}^2$ linking the node $n_2^2$ to the node $n_3^2$. The edge $E_{23}^2$ has an edge attribute value "sibling of" indicating that the entity represented by node $n_2^2$ is a sibling of the entity represented by node $n_3^2$. The graph 420 further includes an edge $E_{32}^2$ linking the node $n_3^2$ to the node $n_2^2$. The edge $E_{32}^2$ has an edge attribute value "sibling of" indicating that the entity represented by node $n_3^2$ is a sibling of the entity represented by node $n_2^2$.

Operations begin at step 401, where a computing system (e.g., computing system 100, computing system 600, and/or the like) can traverse the graph (e.g., graph 420, etc.) and process each edge of the five edges, $E_{12}^2$, $E_{13}^2$, $E_{14}^2$, $E_{23}^2$, and $E_{32}^2$, to determine properties of the relations represented by the edges and to build them into a table entry or transaction. In some embodiments, the properties associated with an edge may, for example, include all attribute values of the source node and the target node connected to the edge, the edge attribute value of the edge, and the edge attribute values of any other edge(s) linking the target node. As an example, these operations of traversing the graph and building entries/transactions may result in the following five entries/transactions, $T_1^2$ to $T_5^2$, associated respectively with the edges $E_{12}^2$, $E_{13}^2$, $E_{32}^2$, $E_{23}^2$, and $E_{14}^2$.

$T_1^2$={E1.status: married; E2.status: single; E1.parentOf.E2; E2.isSibling.E3; E1.parentOf.E3};

$T_2^2$={E1.status: married; E2.status: single; E1.parentOfE2; E2.isSibling.E3; E1.parentOf.E3};

$T_3^2$={E1.status: single; E2.status: single; E1.isSibling.E2; E2.isSiblingE1};

$T_4^2$={E1.status: single; E2.status: single; E1.isSibling.E2; E2.isSiblingE1}; and $T_5^2$={E1.status: married; E2.status:married; E1.spouseOf.E2}.

In this example, E1 may refer to the source node and E2 may refer to the target node in an edge.

Operations proceed to step 403, where the computing system can apply a predefined or predetermined association algorithm on the table entries $T_1^2$ to $T_5^2$ for use in determining association rules based, at least in part, on the relations and properties/attributes. In some embodiments, the association algorithm may, for example, be an a priori algorithm. The association algorithm can be applied on the transactions/entries to determine a set of association rules with enough confidence (e.g., confidence above a defined level). The association rules can represent the expected relations between types of edges (e.g., links) between the nodes and the attributes of these nodes. As an example, a set of resulting association rules may include the following three rules. Rule 1: E1.parentOf.E2 AND E1.parentOf.E3=>E2.isSibling.E3. Rule 1 may be inferred from entries $T_1^2$ and $T_2^2$. Rule 2: E1.isSibling.E2=>E2.isSibling.E1. Rule 2 may be inferred from entries $T_3^2$ and $T_2^2$. Rule 3: E1.isSpouseOf.E2=>E1.status: married AND E2.status: married. Rule 3 is inferred from entry $T_5^2$. Each of the association rules may include a condition part and a consequence part. For example, in the above rules, the consequence part of each association rule is indicated/preceded by the symbol "=>".

FIG. 5A is a flowchart of operations 500 for detecting data quality issues for data in a graph database in accordance with embodiments of the present disclosure. The operations of FIG. 5A may be described with reference to the graph 520 shown in FIG. 5B.

The graph 520 comprises four nodes $n_1^1$, $n_2^1$, $n_3^1$, and $n_4^1$. Each of the nodes $n_1^1$, $n_2^1$, $n_3^1$, and $n_4^1$ includes values of the entity attributes ID and Status of the entity associated with the node. For example, the node $n_1^1$ represents an entity being a person having ID=1 and a single status. The graph 520 further includes an edge $E_{12}^1$ linking the node $n_1$ (e.g., the source node) to the node $n_2^1$ (e.g., the target node). The edge $E_{12}^1$ has an edge attribute value "parent of" indicating that the entity represented by node $n_1$ is a parent of the entity represented by node $n_1$. The graph 520 further includes an edge $E_{13}^1$ linking the node $n_1^1$ to the node $n_3^1$. The edge $E_{13}^1$ has an edge attribute value "parent of" indicating that the entity represented by node $n_1^1$ is a parent of the entity represented by node $n_3^1$. The graph 520 further includes an edge $E_{14}^1$ linking the node $n_1^1$ to the node $n_4^1$. The edge $E_{14}^1$ has an edge attribute value "spouse of" indicating that the entity represented by node $n_1^1$ is a spouse of the entity represented by node $n_4^1$. The graph 520 further includes an edge $E_{23}^1$ linking the node $n_2^1$ to the node $n_3^1$. The edge $E_{23}^1$ has an edge attribute value "parent of" indicating that the entity represented by node $n_2^1$ is a parent of the entity represented by node $n_3^1$.

Operations begin at step 501, where a computing system (e.g., computing system 100, computing system 600, and/or the like) can traverse a graph (e.g., graph 520, etc.) to process each edge, for example, the four edges, $E_{12}^1$, $E_{13}^1$, $E_{14}^1$, and $E_{23}^1$, to determine properties of the relation(s) represented by each edge and build them into a table entry/transaction (e.g., in a similar way as described in step 401). The properties of the relation(s) represented by each edge can include the attribute values of the source node and the target node connected to each edge, the edge attribute value of each edge, and the edge attribute values of any other edge(s) linking the target node to a neighbor node. As an example, these operations of traversing the graph and building entries/transactions may result in the output of the following respective four table entries/transactions, $T_1^1$ to $T_4^1$, associated respectively with the edges $E_{12}^1$, $E_{13}^1$, $E_{14}^1$, and $E_{23}^1$.

$T_1^1$={E1.status: Single; E2.status: Single; E1.parentOf.E2; E2.parentOf.E3; E1.parentOf.E3};

$T_2^1$={E1.status: single; E2.status: single; E1.parentOf.E2};

$T_3^1$={E1.status: Single; E2.status:Married; E1.spouseOf.E2}; and $T_4^1$={E1.status: Single; E2.status:Single; E1.parentOf.E2}.

In this example, E1 may refer to the source node and E2 may refer to the target node connected to an edge.

Operations proceed to step 503, where the computing system can apply association rules (e.g., data quality rules, etc.), such as defined in step 403 above, on the four table entries/transactions, $T_1^1$, $T_2^1$, $T_3^1$, and $T_4^1$, obtained in step 501. As an example, the operations of applying the association rules may result in the following determinations. The entry/transaction $T_1^1$ violates Rule 1 (E1.parentOf.E2 AND E1.parentOf.E3=>E2.isSibling.E3). Rule 1 is applicable because the condition part of the rule, E1.parentOf.E2 and E1.parentOf.E3, is present in (e.g., verified by) the entry/transaction $T_1^1$. However, the consequence part of the rule, E2.isSibling.E3, is missing from (e.g., not verified by) the entry/transaction $T_1^1$, and thus the entry/transaction $T_1^1$ violates Rule 1. The entry/transaction $T_3^1$ violates Rule 3 (E1.isSpouseOf.E2=>E1.status: married AND E2.status: married). Rule 3 is applicable because the condition part of the rule, E1.spouseOf.E2, is present in (e.g., verified by) the entry/transaction $T_3^1$. However, the entry/transaction $T_3^1$ includes E1.status: Single, and thus the consequence part of Rule 3 (E1.status: married AND E2.status: married) is not matched in (e.g., is not verified by) the entry/transaction $T_3^1$, so the entry/transaction $T_3^1$ violates Rule 3. As such, one or more of the nodes and/or links associated with entry/transaction $T_1^1$ and entry/transaction $T_3^1$ can be provided (e.g., marked, etc.) with an indicator of a potential data quality issue.

Figure 6:
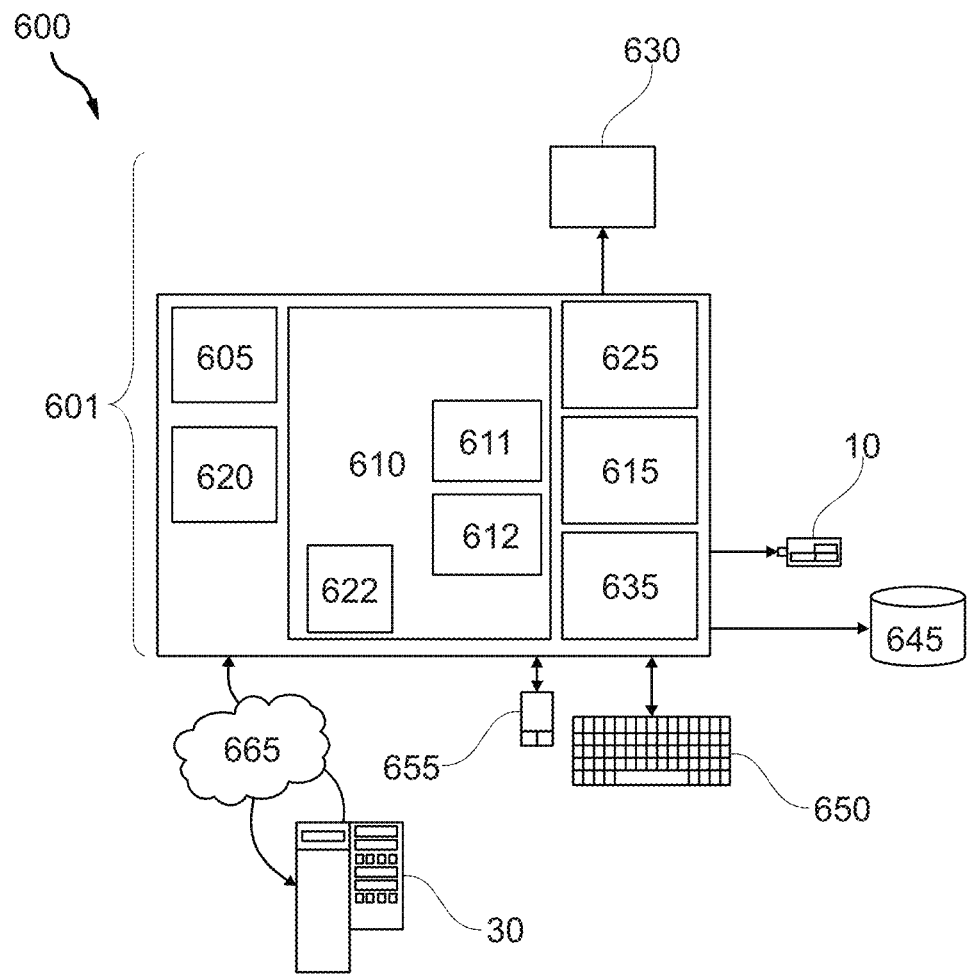
FIG. 6 illustrates an example computing system, suited for implementing one or more operations, as provided in the embodiments of the present disclosure.

FIG. 6 represents a general computing system 600 suited for implementing at least part of the operations described herein, in accordance with embodiments of the present disclosure.

It will be appreciated that the operations and/or methods described herein can be at least partly non-interactive, and automated by way of computerized systems, such as servers or embedded systems. In some embodiments however, the operations and/or methods described herein can be implemented in an, at least partially, interactive system. These operations and/or methods can further be implemented in software (e.g., software 612, BIOS 622, firmware, etc.), hardware (e.g., processor 605, etc.), or a combination thereof. In some embodiments, the operations and/or methods described herein can be implemented in software, as an executable program, that can be executed by a special or general-purpose digital computer, such as a personal computer, workstation, minicomputer, mainframe computer, and/or the like. As illustrated in FIG. 6, system 600 therefore includes a general-purpose computer 601.

In some embodiments, in terms of hardware architecture, as shown in FIG. 6, the computer 601 includes a processor 605, memory (e.g., main memory, etc.) 610 coupled to a memory controller 615, and one or more input and/or output (I/O) devices (or peripherals) 10, 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor-based microprocessor (e.g., in the form of a microchip or chip set), and/or generally any device for executing software instructions.

The memory 610 can include any one or combination of volatile memory elements (e.g., random access memory (RAM), such as DRAM, SRAM, SDRAM, etc.) and non-volatile memory elements (e.g., read-only memory (ROM), erasable programmable read only memory (EPROM), electronically erasable programmable read only memory (EEPROM), programmable read only memory (PROM), etc.). Note that the memory 610 can have a distributed architecture, where various components are situated remote from one another, but can be accessed by the processor 605.

The software 612 in memory 610 may include one or more separate programs, each of which comprises an ordered listing of executable instructions for implementing logical functions, notably, functions involved in embodiments of the present disclosure. In the example of FIG. 6, software 612 in the memory 610 includes instructions (e.g., instructions to manage databases such as a database management system, etc.).

The software in memory 610 shall also typically include a suitable operating system (OS) 611. The OS 611 essentially controls the execution of other computer programs, such as possibly software 612 for implementing operations as described herein.

The methods described herein may be in the form of a source program, an executable program (e.g., object code), script(s), and/or any other entity comprising a set of instructions (e.g., software 612, etc.) to be performed. For a source program, the program needs to be translated via a compiler, assembler, interpreter, or the like, which may or may not be included within the memory 610, to operate properly in connection with the OS 611. Furthermore, the methods can be written as an object-oriented programming language, which has classes of data and methods, or a procedure programming language, which has routines, subroutines, and/or functions.

In example embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 600 can further include a display controller 625 coupled to a display 630. In some embodiments, the system 600 can further include a network interface for coupling to a network 665. The network 665 can be an IP-based network for communication between the computer 601 and any external server, client and/or the like via a broadband connection. The network 665 transmits and receives data between the computer 601 and external systems 30, which can be involved to perform part, or all of the steps of the methods discussed herein. In exemplary embodiments, network 665 can be a managed IP network administered by a service provider. The network 665 may be implemented in a wireless fashion, for example, using wireless protocols and technologies, such as Wi-Fi, WiMAXs, and/or the like. The network 665 can also be a packet-switched network such as a local area network, wide area network, metropolitan area network, Internet network, and/or other similar type of network environment. The network 665 may be a fixed wireless network, a wireless local area network W(LAN), a wireless wide area network (WWAN), a personal area network (PAN), a virtual private network (VPN), intranet, and/or other suitable network system and includes equipment for receiving and transmitting signals.

If the computer 601 is a PC, workstation, intelligent device, and/or the like, the software in the memory 610 may further include a basic input output system (BIOS) 622. The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software 612 stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software 612, as is shown in FIG. 6, the methods can be stored on any computer readable medium, such as storage 620, for use by or in connection with any computer related system or method. The storage 620 may comprise a disk storage such as hard disk drive (HDD) storage.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method for evaluating data quality in a computer database comprising:
    obtaining, by a processor, a first graph associated with an employee ontology, the first graph including first nodes respectively representing first entities and first edges respectively representing relationships between first entities, with each first node respectively including first entity attribute values descriptive of its respectively corresponding first entity and each first edge including first edge attribute values descriptive of the relationship represented by the first edge;
    determining, by the processor, a first subgraph for a certain node of the first nodes of the first graph, wherein the first subgraph represents a single domain within the employee ontology, the first subgraph including the certain node and at least one neighboring node of the certain node; and
    determining, by the processor, a data quality issue regarding the certain node based, at least in part, on applying one or more data quality rules corresponding to the single domain, wherein the one or more data quality rules relate to relationships between first entity attribute values of first nodes within the first subgraph and first edge attribute values of first edges within the first subgraph.

2. The computer-implemented method of claim 1, further comprising:
    determining, by the processor, that the data quality issue is associated with at least one or more of:
        one or more first entity attribute values of the certain node; and
        one or more first edge attribute values of a first edge to which the certain node is connected.

3. The computer implemented method of claim 1, further comprising:
    providing, by the processor, an indication that the data quality issue is associated with at least one of the certain node and a first edge to which the certain node is connected.

4. The computer implemented method of claim 1, wherein a distance in the first subgraph between the certain node and any other first node of the first subgraph is smaller than or equal to one distance of a predefined set of distances.

5. The computer implemented method of claim 1, wherein the first subgraph is formed by the certain node, another first node connected to the certain node via a first edge and at least one first node neighboring to the certain node or neighboring to the another first node connected to the certain node.

6. The computer implemented method of claim 4, further comprising:
    obtaining, by the processor, a second graph comprising second nodes representing second entities and second edges representing relationships between second entities, the second nodes being associated with second entity attributes descriptive of the second entities represented by the second nodes, the second edges being associated with second edge attributes descriptive of the relationships represented by the second edges;
    generating, by the processor, for each second edge of the second graph, one or more second subgraphs, each second subgraph of the second subgraphs having a distance between a second node of the second edge and any other second node of the second subgraph smaller than or equal to a predefined maximum neighborhood level, the maximum neighborhood levels of the second subgraphs defining the set of distances;
    determining, by the processor, the set of data quality rules based, at least in part, on relations between attribute values of second entity attributes and attribute values of second edge attributes of the generated second subgraphs; and
    providing, by the processor, the set of data quality rules for use in detecting the data quality issue.

7. The computer implemented method of claim 6, further comprising:
    defining, by the processor, the maximum neighborhood level such that a number of nodes in the second subgraph is smaller than a maximum number of nodes.

8. The computer implemented method of claim 6, wherein the determining of the set of data quality rules further comprises:
    generating, by the processor, a database entry for each second subgraph of the second subgraphs, the database entry comprising the entity attribute values and edge attribute values of the second nodes and the second edges of each respective second subgraph;

applying, by the processor, an association algorithm on the database entries to detect association rules; and selecting, by the processor, association rules from the detected association rules based, at least in part, on a confidence associated with each detected association rules, wherein the data quality rules comprise the selected association rules.

9. The computer implemented method of claim 8, wherein the selecting of the association rules further comprises:

eliminating, by the processor, detected association rules having a confidence smaller than a threshold.

10. The computer implemented method of claim 6, wherein the first graph and the second graph are sub-graphs of a same graph.

11. The computer implemented method of claim 1, further comprising:

obtaining, by the processor, a second graph comprising second nodes representing second entities and second edges representing relationships between second entities, the second nodes being associated with second entity attributes descriptive of the second entities represented by said second nodes, the second edges being associated with second edge attributes descriptive of the relationships represented by said second edges;

generating, by the processor, for each second edge of the second graph, a second subgraph having a same structure as the first subgraph;

determining, by the processor, the set of data quality rules based, at least in part, on relations between attribute values of second entity attributes and attribute values of second edge attributes of the generated second subgraphs; and providing, by the processor, the set of data quality rules for use in detecting the data quality issue.

12. A computer program product for evaluating data quality in a computer database, the computer program product comprising one or more computer readable storage devices and program instructions sorted on the one or more computer readable storage devices, the program instructions comprising instructions to:

obtain a first graph associated with an employee ontology, the first graph including first nodes respectively first entities and first edges respectively representing relationships between first entities, with each first node respectively first entity attribute values descriptive of attribute values descriptive of the relationship represented by the first edge;

determine a first subgraph for a certain node of the first nodes of the first graph, wherein the first subgraph represents a single domain within the employee ontology, the first subgraph including the certain node and at least one neighboring node of the certain node; and determine a data quality issue regarding the certain node based, at least in part, on applying one or more data quality rules corresponding to the single domain, wherein the one or more data quality rules relate to relationships between first entity attribute values of first nodes within the first subgraph and first edge attribute values of first edges within the first subgraph.

13. The computer program product of claim 12, further comprising program instructions to provide an indication that the data quality issue is associated with at least one of the certain node and a first edge to which the certain node is connected.

14. The computer program product of claim 12, wherein the first subgraph is formed by the certain node, another first node connected to the certain node via a first edge and at least one first node neighboring to the certain node or neighboring to the another first node connected to the certain node.

15. The computer program product of claim 12, further comprising instructions to:

obtain a second graph comprising second nodes representing second entities and second edges representing relationships between second entities, the second nodes being associated with second entity attributes descriptive of the second entities represented by the second nodes, the second edges being associated with second edge attributes descriptive of the relationships represented by the second edges;

generate, for each second edge of the second graph, one or more second subgraphs, each second subgraph of the second subgraphs having a distance between a second node of the second edge and any other second node of the second subgraph smaller than or equal to a predefined maximum neighborhood level, the maximum neighborhood levels of the second subgraphs defining a set of distances;

determine the set of data quality rules based, at least in part, on relations between attribute values of second entity attributes and attribute values of second edge attributes of the generated second subgraphs; and provide the set of data quality rules for use in detecting the data quality issue.

16. The computer program product of claim 15, wherein the determining of the set of data quality rules further comprises program instructions to:

generate a database entry for each second subgraph of the second subgraphs, the database entry comprising the entity attribute values and edge attribute values of the second nodes and the second edges of each respective second subgraph;

apply an association algorithm on the database entries to detect association rules; and select association rules from the detected association rules based, at least in part, on a confidence associated with each detected association rules, wherein the data quality rules comprise the selected association rules.

17. A computer system for evaluating data quality in a computer database, the system comprising:

one or more computer processors;

one or more computer readable storage media;

computer program instructions;

the computer program instructions being stored on the one or more computer readable storage media for execution by the one or more computer processors; and the computer program instructions comprising instructions to:

obtain a first graph associated with an employee ontology, the first graph including first nodes respectively first entities and first edges respectively representing relationships between first entities, with each first node respectively first entity attribute values descriptive of attribute values descriptive of the relationship represented by the first edge;

determine a first subgraph for a certain node of the first nodes of the first graph, wherein the first subgraph represents a single domain within the employee ontology, the first subgraph including the certain node and at least one neighboring node of the certain node; and determine a data quality issue regarding the certain node based, at least in part, on applying one or more data quality rules corresponding to the single domain, wherein the one or more data quality rules relate to relationships between first entity attribute values of first nodes within the first subgraph and first edge attribute values of first edges within the first subgraph.

18. The computer system of claim 17, further comprising instructions to:

provide an indication that the data quality issue is associated with at least one of the certain node and a first edge to which the certain node is connected.

\* \* \* \* \*